United States Patent Office 3,100,171
Patented Aug. 6, 1963

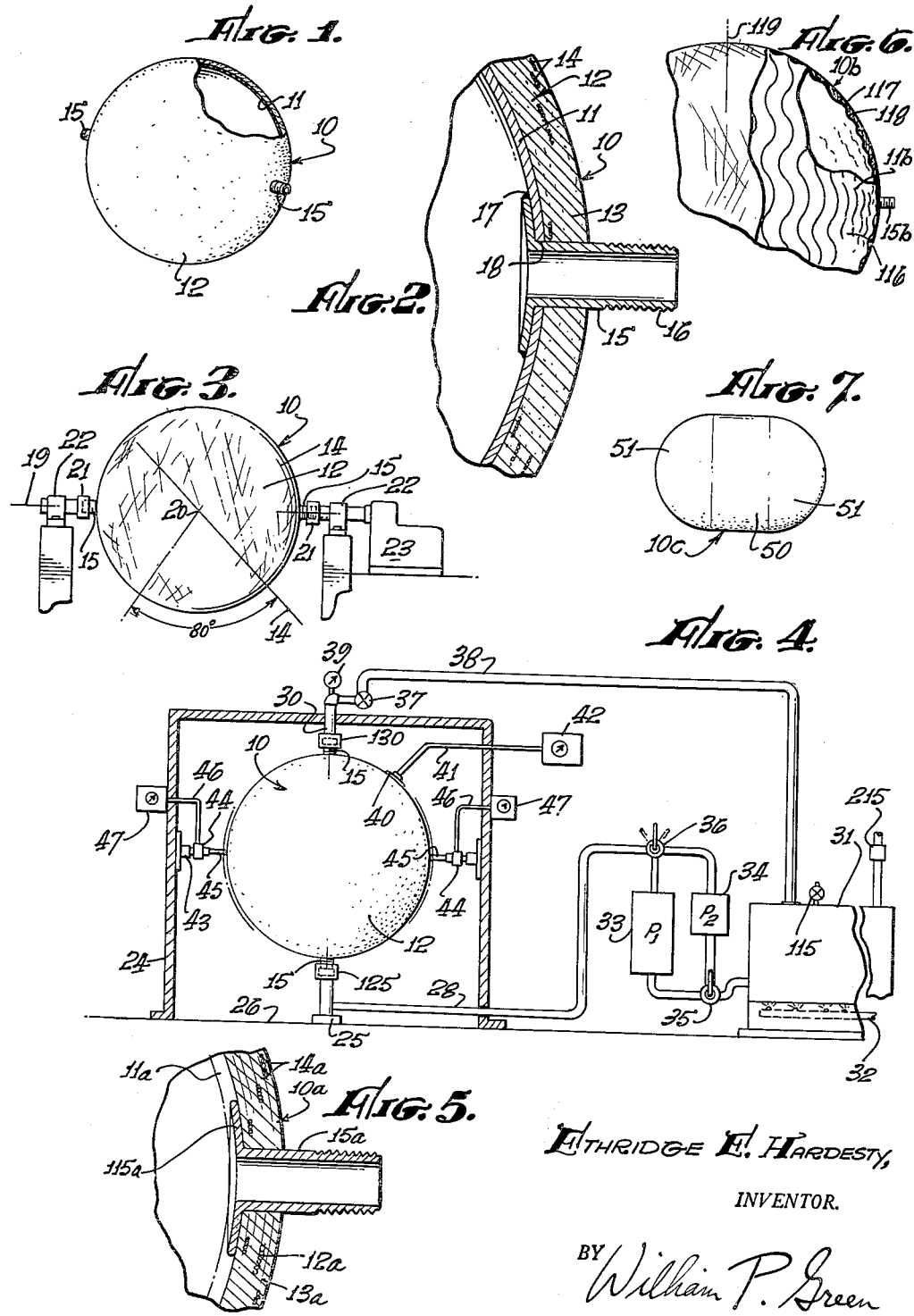

3,100,171
METHOD AND APPARATUS FOR FORMING A PRE-STRESSED HOLLOW LINED PRESSURE VESSEL
Ethridge E. Hardesty, Costa Mesa, Calif., assignor of one-half to Ralph E. Lazarus, as trustee, Los Angeles, Calif.
Filed May 29, 1958, Ser. No. 738,878
7 Claims. (Cl. 156—165)

This invention relates to an improved method and apparatus for forming a hollow pressure vessel for containing a gas or liquid under pressure.

In certain instances in which pressure vessels are utilized, it is extremely important that the weight of the vessel itself, as compared with the weight of the contained fluid, be kept to an absolute minimum. This is true for example in the case of the fluid-containing tanks of a missile, as well as in various other airborne installations. With this in mind, the general object of the present invention is to provide a pressure vessel which can be considerably lighter than prior vessels for the same purpose, and yet which in spite of its low weight, can hold fluids at extremely high pressures, say in the order of 5,000 p.s.i. or higher.

A vessel formed in accordance with the invention has a wall which is at least in part formed of a resinous thermosetting plastic material having a reinforcing material in filament or fiber form embedded therein. This reinforcing material preferably takes the form of one or more filaments, such as strands of glass, wound continuously about an inner shell or mandrel through many successive turns, though it might be possible in some installations that the reinforcing material could be pre-woven into a glass cloth or other woven material. The resin may be applied to the reinforcing material in uncured state before the winding operation, and subsequent curing of the resin then binds the filaments in fixed positions to form a hard and strong wall of the vessel.

Certain features of novelty of the invention reside in a unique way of strengthening the reinforced resin wall by compacting and pre-stressing its components during the curing of the resin. More specifically, this is effected by internally pressurizing the vessel during the curing, to thereby expand the resin and filaments outwardly just sufficiently to assure maximum compactness, and to stretch or pre-stress the filaments to the condition to which they will subsequently stretch when the vessel is filled with pressure fluid in use. The pressurization may be progressively increased as the curing progresses, and as the strength and hardness of the wall therefore increase. Desirably, the pressurization is effected by a heated fluid which is filled into the vessel, and whose heat is utilized for simultaneously curing the resin.

During the pressurizing step, the resin and filament material is carried on the inner shell or mandrel to which this material has been applied. Certain particular features of the invention have to do with the use of this shell, in some instances, as an inner fluid impervious liner, which is bonded to the resinous layer by curing of the resin, and which therefore forms an integral part of the ultimate pressure vessel. The liner is desirably formed of a rigid material, such as a metal, which is only slightly expansible under the very high pressures encountered during curing of the resin, and in use. The expansion of this inner liner should not exceed the elastic limit of that material. To attain maximum strength with minimum wall thickness, the pressure vessel may be spherical in shape, or in some cases may be cylindrical with hemispherical (or paraboloid) ends.

When it is desired to remove the inner shell or mandrel after curing of the resin, the hollow shape of the vessel normally renders such removal rather difficult. In such cases, the present invention contemplates a unique manner of removal, by dissolving the material of the shell in a suitable solvent, which will remove that material but will not affect the resin.

The above and other features and objects of the present invention will be better understood from the following detailed description of the typical embodiments illustrated in the accompanying drawing in which:

FIG. 1 is a view, partially broken away, of a completed pressure vessel constructed in accordance with the invention;

FIG. 2 is an enlarged fragmentary section through the FIG. 1 vessel, taken at the location of one of its pressure connections;

FIG. 3 represents diagrammatically the manner of winding a resin coated filament onto the liner of the FIG. 1 pressure vessel;

FIG. 4 represents the apparatus for curing the resin in the outer layer of the pressure vessel;

FIG. 5 is a fragmentary sectional view similar to FIG. 2, but showing a variational form of the invention; and FIGS. 6 and 7 are views showing two additional forms of the invention.

Referring first to FIGS. 1 and 2, I have shown at 10 a spherical pressure vessel constructed in accordance with the invention, and which may typically be a tank for holding a fluid within a missile at an extremely high pressure, for example in the order of about 5000 pounds per square inch. This pressure vessel 10 has an inner spherical liner or shell 11 formed of a material which is desirably essentially rigid, but will expand to a certain extent when the extremely high operating pressures are applied to the interior of the pressure vessel, in use. About the outside of line or shell 11, there is provided an outer layer of material 12, formed of a resinous plastic material 13 having a reinforcing filament or filaments 14 embedded therein. At two diametrically opposite locations, the vessel 10 has two radially outwardly projecting pressure fittings or connections 15, which are tubular and are threaded (typically externally) at 16 for attachment to mating pressure fittings. In some cases, only one such fitting 15 may be employed. At their inner ends, these pressure connections 15 are annularly welded or otherwise rigidly secured at 17, in fluid tight sealing relation, to the liner or shell 11, which has an opening 18 at the location of each fitting 15 for passing fluid into and out of the pressure vessel.

In manufacturing the vessel 10, the first step may be to form the liner 11 of a suitable material, and to apply the pressure fittings 15 thereto. For many uses, it is desirable that liner 11 be formed of a rigid metal, which is effectively bonded to the outer layer 12 continuously over the surface of liner 11, so that the liner 11 is an integral part of the ultimate pressure vessel 10. In this instance, the liner 11 is formed of a material which is impervious to the gas or liquid which is to be contained in vessel 10, so that the metal effectively prevents the leakage of any of the fluid from the vessel through its walls. For some uses, the liner 11 may be formed of steel, while in other situations, in which the attainment of minimum weight is of extreme importance, the liner may be formed of aluminum or other very light metal. The thickness of the liner wall may typically be between about .015 to .125 inch thick preferably about .025 inch where the vessel is to retain pressures up to about 5000 pounds per square inch, and where the liner is formed of steel or aluminum. The metal of liner 11 is so selected as to be capable of a certain amount of resilient expansion, following which it will resiliently return to its original condition without damage to the liner.

FIG. 5 is a view corresponding to FIG. 2, but showing a variational form of pressure vessel 10a constructed in accordance with the invention. This vessel 10a is the same as vessel 10 of FIGS. 1 and 2, except for the fact that the liner or shell 11a is removed from outer layer 12a, after the resin of the outer layer has been cured to a hardened polymerized condition. The construction of this outer layer, of resin 13a and filament form reinforcing material 14a, is the same as the construction of layer 12 of FIG. 2. Similarly, the tubular pressure connections 15a are constructed the same as fittings 15 of FIGS. 1 and 2, except that the inner flange portion 115a of element 15a is not welded to the shell 11a. In the FIG. 5 arrangement, the shell 11a is formed of a material which can be dissolved within a suitable fluid, such as water, after the outer resinous layer 12a has been cured. Two materials which may be utilized for this purpose, and which are dissolvable in water, are polyvinyl alcohol, such as that sold by Reynolds Metals Company under the trade name "Reynolon"; and ethylene oxide, such as that sold by Union Carbide Chemicals Company of New York, New York as "Polyox." Also, the following substances which are dissolvable in other solvents may be utilized in the FIG. 5 arrangement: ethyl cellulose, vinyl (polyvinylidene) chloride, and polyethylene. These substances may be dissolved in such solvents as iso-butyl or iso propyl alcohol, ketones, acetone, toluene and the like.

The spherical shell 11 or 11a may be constructed in any conventional manner, as by forming two separate hemispheres, and then welding or otherwise annularly bonding the two halves together in complementary positions. After the inner shell has been formed, and its pressure connections 15 have been attached to the inner shell, that shell or liner is then covered externally by the material which is to ultimately form the outer resinous layer 12. This material is preferably applied by first coating a filament or group of filaments 14 of the reinforcing material with the resin 13 in uncured state, and then by winding this coated filament or group of filaments 14 onto the outer surface of shell 11 or 11a. The filament 14 may for most uses be formed of glass, which may be in the form of either "yarn," a ribbon formed of a group of unidirectional filaments loosely held together in ribbon form, or a "roving," the latter being preferred. As used in this specification, the term "roving" refers to a strand composed of a plurality of substantially parallel, continuous, unspun filaments of glass or other material. Such a roving, or bundle of glass filaments, may contain any desired number of individual strands, say from about ten "ends" up to about one hundred or more.

Instead of glass, it is possible also to utilize any of various other materials, to give to the outer layer of the pressure vessel a desired characteristic or characteristics. For example, the filament 14 may be formed of metal wire, such as steel "piano wire," thin metal or steel strip or ribbon, or such synthetic-fibers as rayon, nylon, acrylic fibers, polyester fibers, or saponified regenerated cellulose as sold by Celanese Corporation of America of New York, New York under the trade name "Fortisan-36." In some cases, a combination of strands of two or more different materials may be wound onto the inner shell 11 or 11a, so that the increased modulus of elasticity of one of the materials may raise the resultant overall modulus to a desired value. For example, a combination of steel "piano wire" and glass fibers can be utilized, so that the increased modulus of elasticity of the steel can give to the overall outer layer a modulus substantially as great as that of the inner metal liner (where metal is employed), so that the metal and resin layers will function more effectively together to retain a contained pressure fluid. Where steel wire is employed, it may have a relatively small diameter, say, in the order of .0005 to .005 inch. Where glass filaments are employed, the roving utilized may typically be of a size such as to require about 15,000 yards per pound.

Referring now to FIG. 3, the strand 14 may be applied to the outer surface of liner 11 or 11a by continuously turning the liner about the diametrical axis 19 extending through the two pressure connections 15, and by simultaneously swinging either the liner 11 or the filament feeding means (not shown) about an axis 20 extending perpendicular to axis 19 and to the plane of the paper in FIG. 3, this swinging motion typically being first in one rotary direction for about 80°, and then in the reverse direction for about 80° (as represented by arrow 119 in FIG. 3). Various "filament winding machines" have been designed in the past for thus winding a filament onto a sphere, and consequently no attempt will be made in the present application to describe specifically any one of these devices. One such machnie is shown in Trevaskis et al. Patent Number 2,788,836 issued April 16, 1957 for "Method and Apparatus for Making Air Pressure Containers." In FIG. 3, the filament winding apparatus has been shown only partially and very diagrammatically, as including a pair of mounting elements or fittings 21 threaded onto the two fittings 15, and journaled in suitable bearings 22 for rotation about axis 19. One of these fittings 21 may be continuously driven by a motor 23, suitably geared to turn the liner or shell 11 at a proper speed. In FIG. 3, it may be assumed that the strand 14 is fed to the liner by hand, or by any suitable feeding apparatus, with resin being applied to the strand before it reaches the liner. The strand feeding apparatus, or the operator's hands where manual feeding is employed, are moved back and forth relative to the liner and about axis 20 so that each turn of the filament about the liner is substantially annular, and extends about the liner at a point of greatest circumference. That is, the filament is at every point substantially tangent to the liner, but this tangential point is constantly moving, thereby building up an outer shell in which all fibrous tension members are acting as individual constricting bands. They are also lying omni-directional to each other and therefore parallel to any and all lines of peripheral tension caused by the application of internal pressure. One of the bearings may of course be detachable, to allow removal of liner 11. The liner 11 or 11a must be essentially rigid, to withstand the forces exerted against it by the strand and the other portions of the apparatus during the winding operation. Obviously, the actual apparatus for preforming the filament winding operation will not be constructed in the manner shown in FIG. 3, since this showing has been included only to represent very diagrammatically the principle of operation of the apparatus.

After the filament 14 has been wound onto core 11 or 11a to a sufficient thickness to give the ultimate pressure container 10 the desired strength, preferably to a thickness several times as great as the thickness of the liner 11 or 11a, then the wound vessel is removed from the apparatus of FIG. 3, and is placed in the curing chamber represented in FIG. 4. This apparatus of FIG. 4 includes an outer exposion proof housing 24 within which the high pressure curing is effected, to protect the operator against damage in the event of rupture of the liner. Within housing 24, suitable means are provided for supporting the wound vessel 10 or 10a stationarily, as by means of an upstanding bottom column 25 mounted on floor surface 26, and a top outlet fitting 30 atached to the top wall of housing 24. Column 25 contains a fluid passage which conducts fluid into liner 10 from an inlet line 28, which extends through an opening 29 in the wall of housing 24. The vessel 10 is detachably but rigidly connectable to column 25 and outlet line 30, in fluid tight sealed relation, by a pair of threaded connector parts 125 and 130.

During a curing operation, a heated pressurizing liquid is fed to the interior of liner 10 through inlet line 28, from a supply tank represented at 31. The liquid within this supply tank is heated in some manner, as by a burner represented at 32. From tank 31, the heated pressurizing fluid may be pumped into the liner by either of two pumps 33 and 34, the former of which is a large volume low pressure pump, while the latter is a small volume but very high pressure pump. Two three way valves 35 and 36 are actuable to selectively connect either of the two pumps 33 and 34 into the fluid supply line. Fluid from discharge fitting 30 flows through a control valve 37 and then through a line 38 back to heated tank 31. The valve 37 is actuable to any of different settings, to vary the restriction offered thereby to flow of fluid into line 38. Also, valve 37 is actuable to a completely closed condition, in which no fluid can return to the tank through line 38. A gauge 39 may be provided at the inlet side of valve 37, to indicate the fluid pressure within vessel 10 at a particular instant. Preferably, the heated liquid which is circulated from tank 31 through vessel 10, etc., is water, to avoid contamination of the interior of the liner by other fluids.

Suitable means are provided for indicating at the outside of housing 24 the temperature of the reinforced resinous layer 12 at any time during the curing operation. For this purpose, there may be provided one or more thermo-couples 40, electrically connected by lines 41 to indicators 42 at the outside of the housing. Also, there are desirably provided means for indicating at the outside of the housing the extent to which the vessel 10 has been expanded by internal pressure. For this purpose, I may provide a ring 43 within housing 24 and extending about vessel 10, typically in a horizontal plane. This ring 43 may carry several evenly circularly spaced transducers 44, whose motion responsive feelers 45 project into contact with the outer surface of outer layer of vessel 10, and which are electrically connected by lines 46 to separate indicators 47 located outside of the housing. These indicators 47 are so designed as to indicate on their dials, or to record, the extent to which feelers 45 have been moved radially outwardly by expansion of vessel 10, so that the operator will know at all times exactly how much the vessel has expanded under the influence of the internal pressure. Typically, six of the transducers 44 may be provided on ring 43.

The resin 13 which completely coats and covers filament or roving 14 should be of a thermosetting type adapted to be cured by heat to a hardened and polymerized state. For this purpose, I may utilize any of various thermosetting resins, preferably selected from the class of resins consisting of the epoxide, phenolic, silicone (organopolysiloxanes), polyurethane, and polyester resins. All of these are curable to a substantially infusible and insoluble state, in which they very effectively bind the different turns of strand 14 in substantially fixed relative positions, so that the outer layer 12 is a very strong and pressure resistant part of the overall structure.

To now describe a complete process of manufacturing a pressure vessel such as that shown in FIGS. 1 and 2, the first step is of course to form the liner 11, with its pressure connections 15, following which the resin coated filament 14 is wound onto the liner as discussed above in connection with FIG. 3. The wound vessel is then mounted in the apparatus of FIG. 4 in the manner shown in that figure. After the vessel is properly mounted, three way valve 35 is turned to a position in which pump 33 takes suction from tank 31, and valve 36 is turned to a position in which the discharge of pump 33 flows into line 28, for delivery to the vessel, while the inlet and discharge of pump 35 are both closed off by valves 35 and 36. Burner 32 is placed in operation until the water or other fluid within tank 31 has been raised to a temperature, which is considerably above the normal ambient temperatures, but is low enough to prevent vaporization of the pressure fluid when it enters vessel 10. Where water is utilized as the pressure fluid, it may initially be at a temperature of about 200° F. The motor driven pump 33 is placed in operation to pump heated fluid from tank 31 into vessel 10, to thereby heat liner 11 and through it to commence the curing of the resin in outer layer 12. During the initial filling of vessel 10 with fluid from tank 31, control valve 37 is left open, so that any air from within vessel 10 can be discharged through upper outlet 15 and back to the tank, from which it may be vented to the atmosphere through a manually actuated vent valve 115. After the pump 33 has completely filled vessel 10, the pump is allowed to continue recirculating the heated fluid through the vessel and back through line 38 to tank 31, until the temperature of vessel 10 is raised to a point just sufficient to start the impregnating resin of layer 12 to flow. This temperature will of course be a different temperature for each of the various resins which may be employed, but the temperature will be known for a particular resin, and will be indicated by the temperature indicating unit 42 at the outside of housing 24.

When the uncured resin of layer 12 begins to soften or reflow, valves 35 and 36 are turned to positions in which the high pressure pump 34 is connected into the circulating line, rather than low pressure pump 33. Valve 37 is then closed to a certain extent, so that pump 34 will commence to raise the pressure within vessel 10. From that point forward, the operator progressively closes or restricts valve 37, to progressively increase the internal pressure within vessel 10 at a rate commensurate with, and substantially proportional to, the curing rate (that is, the gelling, polymerization, or hardening rate) of the particular resin being used. This hardening rate is of course known for a particular resin, under the temperature and pressure conditions being utilized. Also, as the pressure is increased, burner 32 is operated to progressively increase the temperature of the water or other fluid, until the vessel 10 has reached a temperature at which the resin will completely cure.

The internal pressurization of sphere 10 causes inner liner 11 to expand radially outwardly in a manner compacting the resin and filament components of outer layer 12, and prestressing that layer, and particularly its filaments, so that when the pressure vessel is subsequently placed under internal pressure when in use, the tendency for stretching or relative movement of the filaments and resin will be minimized. Thus, the overall strength of the outer layer 12, and consequently of the entire vessel, is vastly increased. This fact has been proven conclusively by actual tests. During the initial portions of the curing operation, the resin 13 within layer 12 is of course soft, and therefore has little or no effect as a binder. It is for this reason that the internal pressure within vessel 10 is maintained at a relatively low value during the first portions of the curing operation. However, as the resin slowly cures, as indicated by the change in temperature registered on unit 42, the strength of the resinous layer increases, so that the internal pressure may be progressively increased, to effect the desired compacting and prestressing action. The extent of expansion of vessel 10 is indicated by units 47 which are actuated by transducers 44, so that the operator can at all times keep the entire pressurizing portion of the process under control. By the time the resin is completely cured, the internal pressure has been raised to a point which will essentially equal a specified performance-confirming objective, usually one and one-half times the designed working pressure. Valve 37 is then closed, and pump 34 is stopped, while the vessel is allowed to gradually cool. During this cooling period, the vessel is maintained under the highest internal pressure which has been attained during the curing process, so that the prestressed condition is maintained until any latent thermoplasticity of the resin has been definitely avoided. During the cooling period, it may of course be necessary to operate pump 34 for very short intervals, as necessary to maintain the proper highest pressure until the cooling has been completed. The temperature of the water or other liquid within tank 31 and within the rest of the system, is such as to assure complete curing of the resin. For the particular resins which have been mentioned previously, the liquid should preferably be about 375° F. during the final portion of the curing process. For most of the uses for which a pressure vessel of the present type is intended, the maximum internal pressure attained within sphere 10 during the curing process should be at least about 1500 pounds per square inch above the external pressure, and preferably between about 3000 and 6000 pounds per square inch. Where a low-boiling liquid is employed for pressurizing the sphere, the pressure or starting pressure of that liquid should be great enough to maintain the fluid in liquid form at its initial temperature. The tank 31 should of course be of a sufficient size to hold as much liquid as may be required in the entire system during the pressurizing operation. Also, suitable means (such as a pump 215—see FIG. 4) may be provided for supplying make-up water or other fluid to tank 31 as needed. In curing, the resin of outer layer 12 preferably bonds tightly to the outer surface of shell 11, so that these parts form together a well integrated spherical chamber. In general the internal pressure within the vessel, during the curing process, at all times approaches that which would stress the vessel, at that time, to its maximum safe value, which increases as the curing progresses. As used in the claims the term "maximum safe value" means the maximum safe value at that stage of the processing.

If the sphere represented in FIG. 5 is to be formed, the liner or shell 11a is formed of a material which can be dissolved out, after the resin has been cured. In this case, the fluid utilized in tank 31 of FIG. 4 must of course be so chosen that it will not dissolve the shell 11a during the curing process. After curing and cooling, the proper solvent is introduced into vessel 10a, and left there for a period sufficient to dissolve the entire shell 11a, to thus remove that shell and leave only the outer compacted and prestressed layer 12a.

*Example 1*

To describe specifically a particular example of a process performed in accordance with the showing of FIGS. 1 to 4, a lined vessel 10 was made, employing a liner 11 formed of aluminum of a thickness of .035 inch. The outer layer 12 was formed of a continuous roving of glass filaments, of a size such that 15,000 yards of the roving or bundle of filaments weighed one pound. This glass filament-form material was coated on all sides with a resin prior to the winding operation, and was wound in the manner represented in FIG. 3. The heating fluid utilized in the FIG. 4 apparatus was water, commencing at a temperature of 200° F. and being raised ultimately to a temperature of 375° F., and which was circulated in the manner previously described, to first fill vessel 10, and then gradually heat the vessel to soften and then cure the resin. Initially, the pressure within vessel 10 was kept at 200 p.s.i., until the resin first softened as indicated by temperature unit 42, following which valve 37 was progressively closed to increase the pressure within shell 10 progressively, and substantially in proportion to the rate of polymerization of the resin. By the time the polymerization was completed, the internal pressure within vessel 10 had reached a top value of 4000 p.s.i. This pressure was maintained while the entire apparatus was allowed to cool, until the shell reached a temperature of about 130° F. The shell formed in this manner proved by tests to withstand a pressure far greater than the pressure which the same shell could have withstood if formed without internal pressurization.

*Example 2*

This example is identical with Example 1 above, except that, after a large number of turns of the glass fibers were wound onto the shell or liner, a corresponding number of turns of metal piano wire, of a diameter of .0025, and coated with the same resin as the glass fibers, were wound about the shell in all different directions, so that in the ultimate product, these metal wires served to increase the modulus of elasticity of the outer resin-impregnated layer 12.

FIG. 6 represents fragmentarily another form of vessel formed in accordance with the invention, and certain features of which are described more specifically and claimed in my copending application Serial Number 767,129 filed October 14, 1958, now Patent No. 2,988,240 on "Lined Pressure Vessel." Briefly, the vessel 10b of FIG. 6 is identical with vessel 10 of FIG. 1, except that the metal liner 11b is provided with a series of waveform deformations or corrugations 116. More specifically, the material of liner 11 waves inwardly and outwardly (very slightly) as it advances from the equator location 119 toward the two poles 15b (only one shown). The peaks 117 and valleys 118 of the wave form each extend generally annularly about the vessel, but as they thus extend about the vessel they each have a secondary waving configuration, first toward the equator 119 and then away from the equator and toward a pole 15b, all as seen clearly in FIG. 6.

The corrugations of liner 11b are provided to increase the extent to which it can expand without reaching its elastic limit. The winding and pressurizing steps are performed in the same manner as discussed in connection with FIGS. 1 to 4, but with the liner expanding to a less corrugated condition during pressurization. This increases the extent to which the vessel can be safely prestressed, and also allows use of the ultimate vessel under conditions in which relatively great temperature changes may be encountered (and might otherwise cause expansion or contraction of the resinous layer beyond the elastic limit of the liner).

FIG. 7 shows a final form of the invention which is the same as that of FIGS. 1 to 4, and is made in the same way, except for the overall shape of the vessel. Specifically, the vessel 10c of FIG. 7 has a cylindrical side wall portion 50, which may be closed at its opposite ends by a pair of rounded end walls 51, typically hemispherical in shape. Both the liner and the outer reinforced plastic layer have this same closed end cylindrical configuration.

I claim:

1. The method of forming a pre-stressed hollow lined pressure vessel that comprises applying to the outside of a hollow thin walled fluid impervious metal liner an outer layer of uncured thermosetting resinous plastic material having filament form reinforcing material embedded therein wound for many turns about the liner, heating said resinous plastic material and thereby curing it to a hardened polymerized state, applying to the interior of said liner during said curing a fluid pressure in excess of any external pressure thereon in an amount approaching that which would stress said vessel to its maximum safe value, thereby expanding said liner and said resinous plastic material and said reinforcing material outwardly by said pressure during said curing, and thereby prestressing said filament form reinforcing material by maintaining it under a high expansive force and tension during said curing of the resinous plastic material, and supporting said vessel at spaced points during said curing while permitting unrestrained expansion thereof.

2. The method as recited in claim 1, including progressively increasing the pressure within said liner as the resinous plastic material cures.

3. The method as recited in claim 1, in which said reinforcing material is a glass filament, said method including winding said glass filament about the liner continuously for many turns and in a plurality of different directions.

4. The method as recited in claim 1, including introducing a heated fluid under pressure into said liner and thereby effecting both said heating of the resinous plastic material and said application of pressure to the interior of the liner.

5. The method as recited in claim 1, including introducing a heated fluid under pressure into said liner and thereby effecting both said heating of the resinous plastic material and said application of pressure to the interior of the liner, said method including progressively increasing the pressure of said fluid as the resinous thermosetting plastic material cures.

6. The method of forming a pre-stressed hollow lined pressure vessel that comprises providing a hollow thin walled liner having corrugations in its side wall, applying to the outside of said liner a layer of an uncured resinous thermosetting plastic material having filament form reinforcing material embedded therein wound for many turns about said liner, heating said resinous plastic material and thereby curing it to a hardened polymerized state, applying internal fluid pressure to said liner during said curing in excess of any external pressure thereon by an amount approaching that which would stress said vessel to its maximum safe value, thereby causing outward expansion of said liner by said pressure to a less corrugated condition during said curing, and thereby prestressing said filament form reinforcing material by maintaining it under a high expansive force and tension during said curing of the resinous plastic material, and supporting said vessel at spaced points during said curing while permitting unrestrained expansion thereof.

7. Apparatus for heating and pressurizing a hollow pressure vessel comprising: a plurality of support means for engaging and supporting spaced portions of said vessel, said support means engaging only a minor fraction of the surface of said vessel, leaving the remainder thereof free of external restraint; one of said supports defining a conduit for conducting fluid under pressure to the interior of said vessel; means for supplying fluid under pressure to the conduit defined by said support; and indicating means having a motion responsive feeler, engageable with an unrestrained portion of said vessel for indicating the extent of expansion thereof by fluid pressure therein.

References Cited in the file of this patent

UNITED STATES PATENTS

| | | |
|---|---|---|
| 2,309,865 | Reach | Feb. 2, 1943 |
| 2,493,153 | Martin | Jan. 3, 1950 |
| 2,512,337 | Klein | June 20, 1950 |
| 2,558,807 | Bailey | July 3, 1951 |
| 2,593,714 | Robinson | Apr. 22, 1952 |
| 2,723,426 | Pelley | Nov. 15, 1955 |
| 2,739,350 | Lampman | Mar. 27, 1956 |
| 2,744,043 | Ramberg | May 1, 1956 |
| 2,773,287 | Stout | Dec. 11, 1956 |
| 2,794,481 | Anderson | June 4, 1957 |
| 2,794,570 | Downs | June 4, 1957 |
| 2,859,796 | Taunton | Nov. 11, 1958 |
| 2,873,226 | Davies et al. | Feb. 10, 1959 |

FOREIGN PATENTS

| | | |
|---|---|---|
| 586,183 | Great Britain | Mar. 10, 1947 |
| 703,811 | Great Britain | Feb. 10, 1954 |